US012379590B2

(12) United States Patent
Morvan et al.

(10) Patent No.: US 12,379,590 B2
(45) Date of Patent: Aug. 5, 2025

(54) RELATIVE HEAD-TRACKING FOR USER-INTERFACE ELEMENT SELECTION ON A HEAD-MOUNTED DISPLAY DEVICE

(71) Applicant: Google LLC, Mountain View, CA (US)

(72) Inventors: Stiven Guillaume Francois Morvan, New York, NY (US); Konstantine Nicholas John Tsotsos, Corte Madera, CA (US); Dongeek Shin, San Jose, CA (US); Tinglin Duan, Toronto (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/468,294

(22) Filed: Sep. 15, 2023

(65) Prior Publication Data
US 2025/0093640 A1 Mar. 20, 2025

(51) Int. Cl.
*G02B 27/00* (2006.01)
*G02B 27/01* (2006.01)
(52) U.S. Cl.
CPC ..... *G02B 27/0093* (2013.01); *G02B 27/0172* (2013.01); *G02B 2027/014* (2013.01); *G02B 2027/0141* (2013.01)
(58) Field of Classification Search
CPC ............ G02B 27/0093; G02B 27/0172; G02B 2027/014; G02B 2027/0141
See application file for complete search history.

(56) References Cited

U.S. PATENT DOCUMENTS

| | | | |
|---|---|---|---|
| 2015/0138073 A1* | 5/2015 | Hennelly | G02B 27/0176 345/156 |
| 2016/0026242 A1* | 1/2016 | Burns | G06F 3/04817 345/633 |
| 2019/0362557 A1 | 11/2019 | Lacey et al. | |
| 2022/0270509 A1 | 8/2022 | Josephson et al. | |
| 2023/0071037 A1 | 3/2023 | Kim et al. | |

OTHER PUBLICATIONS

Hubenschmid, et al., "Stream: Exploring the Combination of Spatially-Aware Tablets with Augmented Reality Head-Mounted Displays for Immersive Analytics", CHI '21, Yokohama, Japan, May 8-13, 2021, 14 pages.
Yang, "Sliding Gaze: Head Movement and Touch Gesture Based Target Selection Technology", http://iplab.jpn.org/paper/yang.pdf, Jul. 2019, 53 pages.

* cited by examiner

*Primary Examiner* — Peter D McLoone
(74) *Attorney, Agent, or Firm* — Brake Hughes Bellermann LLP

(57) ABSTRACT

A head-mounted display device may initiate display of a user interface on a display of the head-mounted display device. A head-mounted display device may compute an angular distance between a previous head orientation and a current head orientation based on head movement data. A head-mounted display device may apply a gain value to the angular distance to move a position indicator to an updated position within a boundary of the user interface, the user interface configured to remain fixed to a location in the display regardless of head movements.

20 Claims, 12 Drawing Sheets

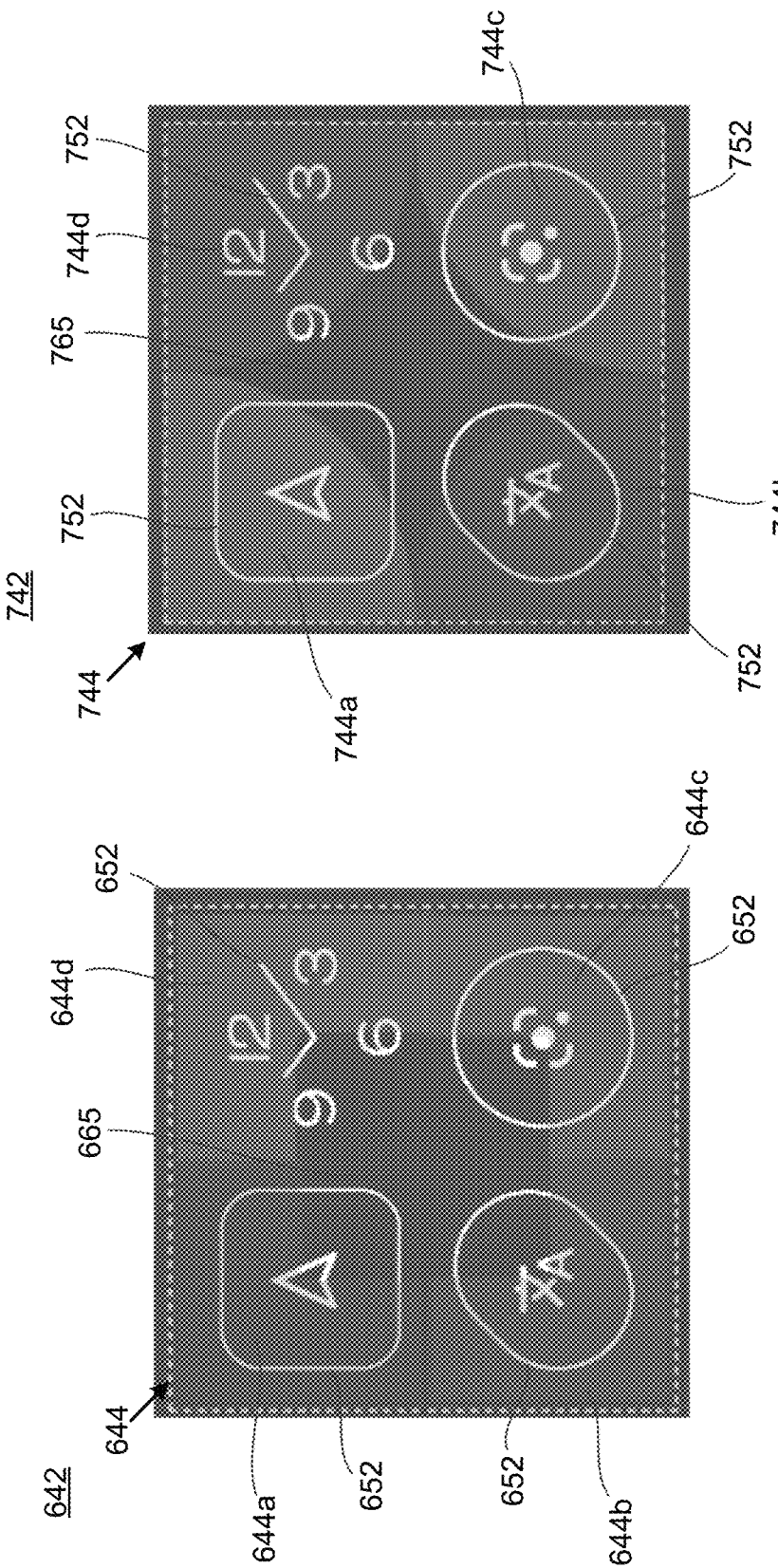

RELATIVE HEAD-TRACKING FOR USER-INTERFACE ELEMENT SELECTION ON A HEAD-MOUNTED DISPLAY DEVICE

BACKGROUND

To select a user interface element, some conventional head-mounted display devices use voice commands, eye tracking, or head gestures. With head gestures, some conventional approaches provide inaccurate results (e.g., multiple attempts to select the desired element) and/or have difficulties disambiguating between intentional and unintentional head-gestures.

SUMMARY

In some aspects, the techniques described herein relate to a non-transitory computer-readable medium storing executable instructions that when executed by at least one processor cause the at least one processor to execute operations, the operations including: computing an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movements.

In some aspects, the techniques described herein relate to a head-mounted display device including: at least one processor; and a non-transitory computer readable medium storing executable instructions that when executed by at least one processor cause the at least one processor to: compute an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movements.

In some aspects, the techniques described herein relate to a method including: computing an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movement.

The details of one or more implementations are set forth in the accompanying drawings and the description below. Other features will be apparent from the description and drawings, and from the claims.

BRIEF DESCRIPTION OF THE DRAWINGS

FIG. 6 illustrates an example of a user interface of the head-mounted display device according to another aspect.

FIG. 7 illustrates an example of a user interface of the head-mounted display device according to another aspect.

DETAILED DESCRIPTION

Figure 1A:
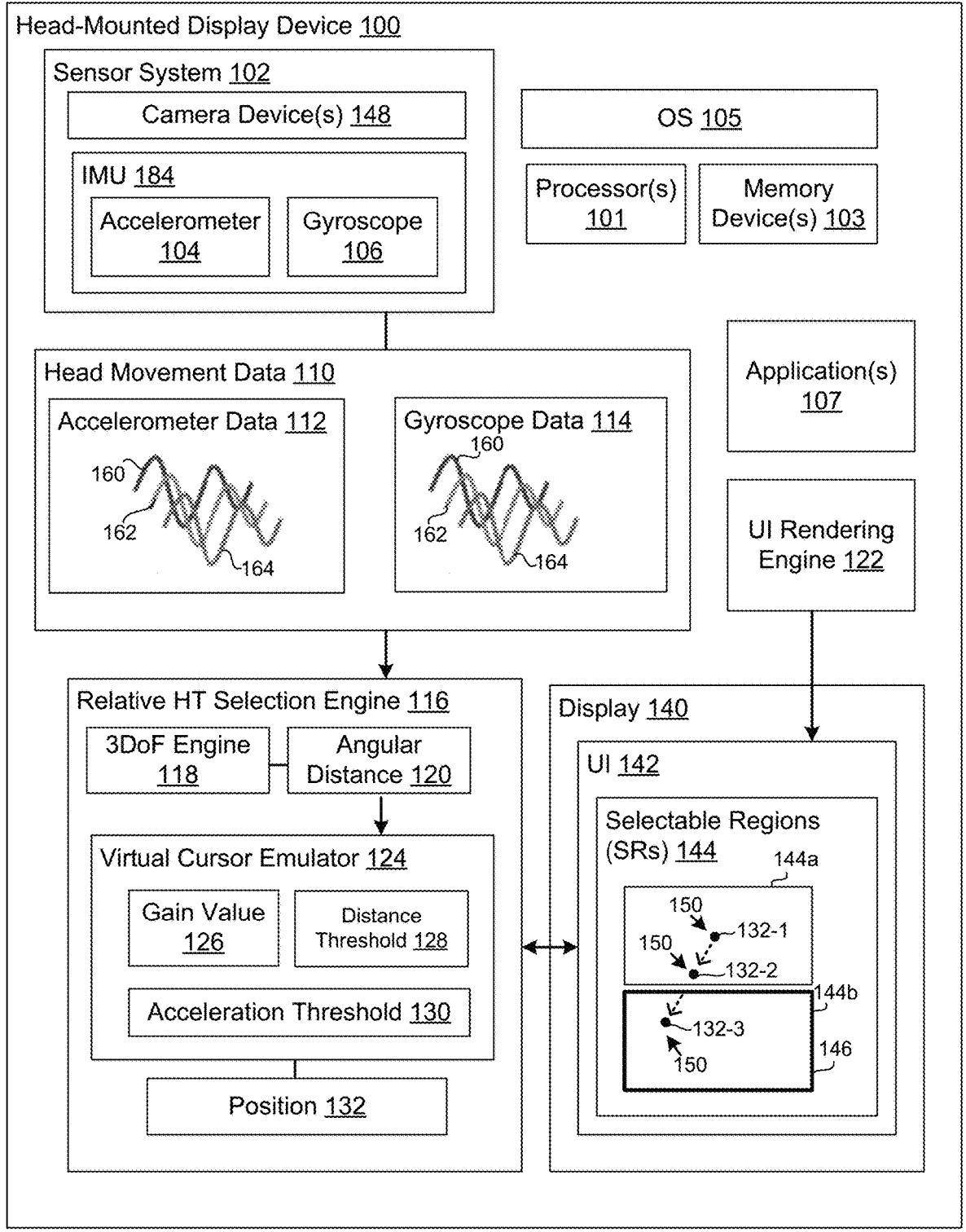
FIG. 1A illustrates a head-mounted display device with a relative head-tracking (HT) selection engine according to an aspect.

The disclosure relates to a head-mounted display device that includes a relative head-tracking (HT) selection engine configured to use relative head-tracking to move a position indicator based on head movement data to trigger a change in selection on a user interface with a plurality of selectable regions. In some examples, the user interface is a head-locked user interface. A head-locked user interface is a user interface that remains fixed (e.g., static) to a location in the device's display regardless (e.g., independent) of head movements. In some examples, the position indicator is an invisible cursor (e.g., a cursor that is not visibly displayed on the display). In some examples, the user interface includes a first selectable region and a second selectable region. In some examples, the user interface includes three selectable regions. In some examples, the user interface includes four selectable regions. In some examples, the selectable regions are arranged as quadrants (e.g., a top left region, a top right region, a bottom left region, a bottom right region). In some examples, the user interface includes more than four selectable regions.

The relative HT selection engine computes an angular distance between a previous head orientation and a current head orientation based on head movement data (e.g., inertial measurement unit (IMU) data) and applies a gain value to the angular distance to update a position of a position indicator on the user interface. The updated position may be the previous position plus the product of the gain value and the angular distance. When the position of the position indicator is detected within a boundary of a new selectable region, the relative HT selection engine detects a selection change and may visually highlight the new selectable region. The gain value defines the sensitivity of the head tracking selection. The gain value may be set to require more or less motion from the user to be able to move the position indicator (e.g., the gain value may amplify or reduce the indicator's movement).

In some examples, the gain value may indicate the amount of per-pixel indicator movement for a certain number of degrees that the user rotates their head. In some examples, the relative HT selection engine updates the position of the position indicator from a previous position to the updated position when the angular distance is greater than a distance threshold (e.g., a minimum distance). In addition, after a selection is detected, the relative HT selection engine may re-position the position indicator to a new position within the newly selected region such as the center of the selected region or a corner portion (or edge portion) of the selected region, which may minimize jitter (e.g., bouncing between two selectable regions).

Some conventional XR approaches use absolute head-tracking to determine a head gaze point and detect whether the head gaze point falls within a boundary of a user element (e.g., the cursor being moved with the user's head gaze). For absolute head tracking, the cursor's movement directly depends on the user's head orientation and head gaze. This conventional approach may cause difficulties for the user to align the cursor on the user interface (e.g., especially with smaller types of user interfaces), and, in some examples, may require a socially awkward gesture to make a user interface selection. However, according to the techniques discussed herein, the position indicator's movement depends on the angular distance (e.g., the delta) between the previous and new head orientation, as well as the gain parameter that is applied to the angular distance to either amplify or reduce the motion of the position's indicator, which can provide subtle and graceful user interactions on the user interface. For example, instead of having a head-ray that moves in an absolute manner depending on head motion, the head-ray may be amplified and may move faster or slower than the head gaze.

In some conventional approaches, applying a gain value to head movement to adjust visual content or a cursor may cause disorientation to the user. For example, in virtual reality (VR) systems, if there is a gap between the head movement and world position, the user may experience motion sickness (e.g., if the user turns ninety degrees but the virtual environment turns one hundred and twenty degrees, the vestibular system may perceive this gap as an anomaly). However, according to the techniques discussed herein, the application of the gain value in conjunction with the head-locked user interface may reduce (or eliminate) potential disorientation to the user. These and other features are further described with reference to the figures.

FIGS. 1A through 1E illustrate a head-mounted display device 100 according to an aspect. The head-mounted display device 100 includes a UI rendering engine 122 configured to render a user interface 142 with a plurality of selectable regions 144 on a display 140 of the head-mounted display device 100. The head-mounted display device 100 includes a relative head-tracking (HT) selection engine 116 configured to move a position indicator 150 on the user interface 142 based on head movement data 110 to trigger a change in selection (e.g., changing a selection from a selectable region 144a to a selectable region 144b). The relative HT selection engine 116 may compute an angular distance 120 between a previous head orientation and a current head orientation based on the head movement data 110 and update a position 132 of the position indicator 150 by applying a gain value 126 to the angular distance 120. When the position 132 of the position indicator 150 is detected within a boundary of a selectable region 144 (e.g., selectable region 144b), the relative HT selection engine 116 detects a selection change and may provide a visual indicator 146 on the newly selected selectable region 144 to indicate that the selectable region 144 has been selected by the user.

The UI rendering engine 122 is configured to render the user interface 142 at a fixed location (e.g., a static location) on the display 140 regardless (e.g., independent) of head movements. In other words, the user interface 142 on the display 140 does not move with head movements (e.g., not responsive to head movements). For example, the user interface 142 does not move on the display 140 from head movements, but rather remains static to the same location on the display 140. The user interface 142 may be in the same position on the display 140, regardless of whether the user's head moves up, down, left, or right.

The user interface 142 is fixed to a specific location on the display 140. In some examples, the user interface 142 is fixed to the center of the display 140. However, the user interface 142 may be fixed to any location (e.g., top right, top left, bottom right, bottom left, etc.) of the display 140. In some examples, the user interface 142 is a small, transparent (e.g., semi-transparent) screen that is positioned in front of the wearer's eyes. In some examples, the display 140 is the physical screen that the user sees through. In some examples, the user interface 142 is referred to as a head-locked interface. Head-locked user interfaces are interfaces that are static to the display 140 of the head-mounted display device 100 worn by the user. In some examples, the head-mounted display device 100 does not update its visuals if the user applies motion to the device (e.g., moves their head). In contrast to some conventional VR headsets, reduced computation (or no additional computation) is required for implementing a head-locked user interface as the position of the head-locked interface stays static to the display 140.

In some examples, the user interface 142 is semi-transparent. In some examples, real-world data can be seen through the user interface 142. In some examples, the user interface 142 is not a world-locked user interface. A world-locked user interface is a user interface that moves with the world. In some examples, a world-locked user interface may be attached to a physical or virtual object, but, as the user moves their head, the world-locked user interface moves on the display 140. In other words, a world-locked user interface may move when the user moves their head, so the world-locked user interface will be in the same position in the virtual world.

In some examples, the user interface 142 is a system interface of the head-mounted display device 100. In some examples, the user interface 142 is an interface of an operating system 105 of the head-mounted display device 100. In some examples, the user interface 142 is an interface of an application 107 executable by the operating system 105. In some examples, the application 107 may communicate with the UI rendering engine 122 and the relative HT selection engine 116 (e.g., via one or more application programming interface(s)) to cause a user interface 142 of the application 107 to be rendered and UI selections are provided back of the application 107.

The display 140 may include a liquid crystal display (LCD), a light-emitting diode (LED) display, an organic light-emitting display (OLED), an electro-phoretic display (EPD), or a micro-projection display adopting an LED light source. In some examples, the case of smartglasses, the display 140 may provide a transparent or semi-transparent display such that the user wearing the glasses can see images provided by the display 140 but also information located in the field of view of the smartglasses behind the projected images.

The user interface 142 may include a plurality of selectable regions 144. In some examples, a selectable region 144 is referred to as a hitbox or trigger area. In some examples, each selectable region 144 includes a UI element. In some examples, the UI element is visibly displayed but the boundary of its respective selectable region 144 is not visible to the user. When a position indicator 150 falls within the boundary of a selectable region 144, the corresponding UI element is visibility highlighted. In some examples, the user interface 142 includes a selectable region 144*a* and a selectable region 144*a*. However, the user interface 142 may include any number of selectable regions 144, including three, four, or any number greater than four. In some examples, the selectable region 144*a* and the selectable region 144*b* are arranged adjacent to each other. In some examples, the selectable region 144*b* is disposed at a location apart from the selectable region 144*b* (e.g., a non-selectable region being located between the selectable region 144*a* and the selectable region 144*b*).

A selectable region 144 may have a predefined shape. In some examples, a selectable region 144 includes a rectangular shape. In some examples, a selectable region 144 includes a non-rectangular shape such as a shape having one or more curved portions. In some examples, a selectable region 144 includes a circle shape. In some examples, the shape of the selectable region 144*b* is the same as the shape of the selectable region 144*a*. In some examples, the shape of the selectable region 144*b* is different from the shape of the selectable region 144*a*. In some examples, an area of the user interface 142 is defined entirely by the selectable regions 144. For example, the user interface 142 may not have any regions other than the selectable regions 144. In some examples, there is always a selection to one of the selectable regions 144, and the user moves their head to select other regions 144.

When a position 132 of a position indicator 150 is detected within a boundary (e.g., a perimeter) of a particular selectable region 144, the relative HT selection engine 116 detects a selection to that particular selectable region 144. In some examples, as shown in FIG. 1A, the position indicator 150 is positioned at a position 132-1, and the user may move their head (e.g., in a down left direction), which causes the position indicator 150 to move from position 132-1 to a position 132-2 and then to a position 132-3 (or from a position 132-1 to a position 132-3). When the position indicator 150 is at the position 132-1 or the position 132-2, the relative HT selection engine 116 may detect a selection to the selectable region 144*a* because the position 132-1 or the position 132-2 are located within a boundary of the selectable region 144*a*, which causes a visual indicator (e.g., a heavy border, etc.) to be applied to the selectable region 144*a*. When the position indicator 150 is moved to the position 132-3, the relative HT selection engine 116 may detect a selection to selectable region 144*b* because the position 132-3 is within a boundary of the selectable region 144*b*, which causes the visual indicator to be applied to the selectable region 144*b*, as shown in FIG. 1A.

In some examples, selection to a particular selectable region 144 based on head movements may cause the selectable region 144 to be highlighted (e.g., providing a visual indicator 146), where the head-mounted display device 100 may require another user gesture (e.g., a tap on a control button on the head-mounted display device 100, a specific head gesture, or other gesture) to activate the underlying action associated with the selectable region 144. For example, the selectable region 144*a* may be associated with a first setting, and the selectable region 144*b* may be associated with a second setting. When the position 132 of the position indicator 150 is detected within the boundary of the selectable region 144*a*, the relative HT selection engine 116 may visually identify the selectable region 144*a* by rendering a visual indicator 146 with respect to the selectable region 144*a*. In some examples, in response to detection of a user tap (e.g., a tap on a UI control button on a frame of smartglasses), the relative HT selection engine 116 may select the first setting and display another user interface (e.g., another user interface 142).

Figure 1B:
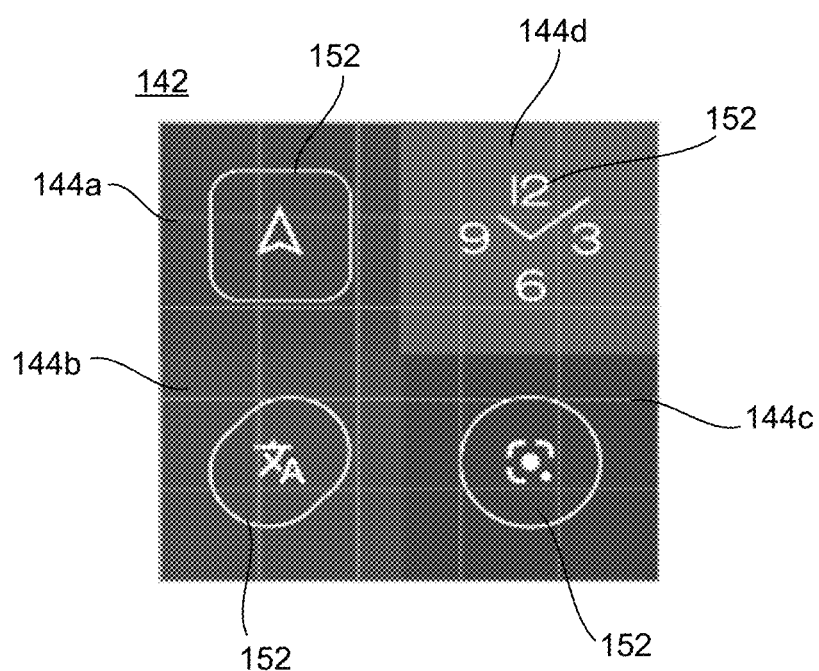
FIG. 1B illustrates an example of a user interface of the head-mounted display device according to an aspect.

In some examples, as shown in FIG. 1B, the user interface 142 includes a plurality of selectable regions 144 arranged as quadrants (e.g., also referred to as quadrant regions). For examples, the selectable regions 144 includes a selectable region 144*a* (e.g., a top right quadrant), a selectable region 144*b* (e.g., a bottom right quadrant), a selectable region 144*c* (e.g., a bottom left quadrant), and a selectable region 144*d* (e.g., a top right quadrant). In some examples, each selectable region 144 includes a UI element 152 that is displayed in a respective selectable region 144. In some examples, an area of the user interface 142 is defined entirely by the selectable regions 144 (e.g., the user interface 142 does not include non-selectable regions (e.g., dead regions)).

In some examples, a selection of a new selectable region 144 is dependent upon the currently selected selectable region 144. In other words, the selection may be not stateless, but rather depends on the current selection and the direction of the head rotation. A heads-up gesture in the bottom-left quadrant (e.g., selectable region 144*b*) versus a heads-up gesture on the bottom-right quadrant (e.g., selectable region 144) may not produce the same outcome. For example, a heads-up gesture in the bottom-left quadrant (e.g., selectable region 144*b*) may cause the selectable region 144*a* to be selected (e.g., visually highlighted), and a heads-up gesture on the bottom-right quadrant (e.g., selectable region 144) may cause the selectable region 144*d* to be selected (e.g., visually highlighted).

Referring back to FIG. 1A, the head-mounted display device 100 includes a sensor system 102. The sensor system 102 includes an inertial measurement unit (IMU) 184 configured to generate head movement data 110 about an acceleration and/or velocity of the head-mounted display device 100. The IMU 184 includes an accelerometer 104 configured to measure an acceleration of the head-mounted display device 100 and generate accelerometer data 112. The accelerometer data 112 includes information about the acceleration of the head-mounted display device 100. The accelerometer data 112 includes information about the acceleration in an x-axis 160, a y-axis 162, and a z-axis 164.

The IMU 184 includes a gyroscope 106 configured to measure a velocity of the head-mounted display device 100 and generate gyroscope data 114. The gyroscope data 114 includes information about the velocity of the head-mounted display device 100. The gyroscope data 114 includes information about the velocity in the x-axis 160, the y-axis 162, and the z-axis 164. In some examples, the head movement data 110 includes the accelerometer data 112 and the gyroscope data 114. In some examples, the head movement data 110 includes the accelerometer data 112. In some examples, the head movement data 110 includes the gyroscope data 114. The sensor system 102 includes one or more camera device(s) 148 configured to detect image data (e.g., image frames) in the camera's field of view. In some examples, the camera device(s) 148 may include one or more imaging sensors. In some examples, the camera device(s) 148 includes a stereo pair of image sensors.

The relative HT selection engine 116 includes a three degrees of freedom (3DoF) engine 118 configured to receive the head movement data 110, and, based on the head movement data 110, compute an angular distance 120 between a previous orientation of the head-mounted display device 100 and a current orientation of the head-mounted display device 100. In some examples, the head movement data 110 includes the raw IMU data (e.g., the accelerometer data 112, the gyroscope data 114). In some examples, the previous orientation of the head-mounted display device 100 is the orientation of the head-mounted display device 100 in a first image frame detected by the camera device(s) 148, and the current orientation of the head-mounted display device 100 is the orientation of the head in a current image frame detected by the camera device(s) 148. In some examples, the angular distance 120 is the distance (e.g., the angular delta) expressed in angles from the previous orientation to the current orientation. In some examples, the angular distance 120 includes information about the amount in degrees in the x-axis 160 and information about the amount in degrees in the y-axis 162.

The relative HT selection engine 116 includes a virtual cursor emulator 124 configured to compute a position 132 of a position indicator 150 based on the angular distance 120 and the gain value 126. As the user moves the head-mounted display device 100, the relative HT selection engine 116 may re-compute the position 132. The position 132 is the location of the position indicator 150 on the user interface 142. In some examples, the user interface 142 has a coordinate system, and the position 132 is a positional coordinate in the x-direction (e.g., along the x-axis 160) and the y-direction (e.g., along the y-axis 162). In some examples, the position 132 includes an x value and a y value.

In some examples, the position indicator 150 is a cursor. In some examples, the position indicator 150 is an invisible cursor (e.g., a cursor that is not visibly displayed on the user interface 142). In some examples, the position indicator 150 is a visible cursor. In some examples, in response to the user interface 142 being rendered by the UI rendering engine 122, the relative HT selection engine 116 may initially set the position indicator 150 at a position 132-1 (e.g., an initial position). In some examples, the position 132-1 is a predetermined location (e.g., a central point) in one of the selectable regions 144 (e.g., the top, left quadrant).

The virtual cursor emulator 124 receives the angular distance 120 and applies a gain value 126 to the angular distance 120 to move the position indicator 150 to an updated position 132 within a boundary of the user interface 142. In other words, the virtual cursor emulator 124 may compute an updated position 132 (e.g., position 132-2 or position 132-3) of the position indicator 150 based on the current position 132 (e.g., position 132-1) and the product of the gain value 126 and the angular distance 120. For example, the updated position 132 (e.g., position 132-2 or position 132-3) may be the current position 132 (e.g., position 132-1) plus the product of the gain value 126 and the angular distance 120. If the angular distance 120 is five degrees left on the x-axis 160 and five degrees downward on the y-axis 162, the updated position 132 may include i) the x value of the position 132-1 plus the product of five (e.g., the angular x degrees) and ii) y value of the position 132-1 plus the product of five (e.g., the angular y degrees) and the gain value 126.

The gain value 126 may be a parameter that amplifies or reduces the movement of the position indicator 150. The specific value for the gain value 126 is implementation-specific and may vary depending on the type of head-mounted display device 100 and the size of the user interface 142. In some examples, the gain value 126 is set to allow a change between selectable regions 144 (e.g., between quadrants) with five to ten degrees of head motion.

In some examples, the virtual cursor emulator 124 determines whether the angular distance 120 is equal to or greater than a distance threshold 128. In some examples, the distance threshold 128 is the minimum distance that the head-mounted display device 100 moves to be able to move the position indicator 150. The virtual cursor emulator 124 may receive the angular distance 120 as the user's head moves and detects when the angular distance 120 is equal to or greater than the distance threshold 128. In response to the angular distance 120 being equal to or greater than the distance threshold 128, the virtual cursor emulator 124 may compute the updated position 132 by applying the gain value 126 to the angular distance 120. In response to the angular distance 120 being less than the distance threshold 128, the virtual cursor emulator 124 may not update the position 132 of the position indicator 150 (e.g., not apply the gain value 126 to the angular distance 120 to move the position indicator 150 to an updated position 132).

In some examples, the virtual cursor emulator 124 may apply an acceleration threshold 130 on the acceleration of the virtual cursor emulator 124. In some examples, the acceleration threshold 130 may assist in differentiating between intentional head gestures for UI selections and other types of movements such as looking away to speak to someone. For example, the virtual cursor emulator 124 may detect whether an acceleration of the head-mounted display device 100 is equal to or greater than an acceleration threshold 130. In some examples, if the acceleration is equal to or greater than the acceleration threshold 130, the virtual cursor emulator 124 may not move the position indicator 150. In some examples, if the acceleration is less than the acceleration threshold 130, the virtual cursor emulator 24 may move the position indicator 150. For example, head movement acceleration may vary during the head gesture and upon visual confirmation of the new selection. Also, head movement acceleration may vary depending on the context and intent (e.g., the user looking away to talk to someone versus the user intentionally moving their head to have a selection change).

The position indicator 150 may remain within the boundary of the user interface 142. For example, if the position indicator 150 is in the center of the top left region, and the user's head moves in an upward direction with a resulting indicator movement (e.g., the gain value 126 multiplied by the angular distance 120) that would position the position indicator 150 outside the coordinates of the user interface 142, the virtual cursor emulator 124 may limit the resulting indicator movement to the boundary of the user interface 142.

In some examples, the user may move the position of the position indicator 150 within a particular selectable region 144 (e.g., selectable region 144a) without necessarily entering a new selectable region 144 (e.g., selectable region 144b). In some examples, when the user interface 142 is initially rendered, the position indicator 150 may be positioned in the center of the selectable region 144a. Then, when a user moves their head at least the distance threshold 128 (which causes the gain value 126 to be applied), the new position is the position 132-2, which is still within the boundary of the selectable region 144a. In other words, a small downward direction (but greater than the distance threshold 128) may cause movement of the position indicator 150 to the position 132-2, and the user would have to continue moving their head downwards (to move the position indicator 150 again) to move the position indicator 150 to the position 132-3, which is within the selectable region 144b.

In some examples, movement of the position indicator 150 (e.g., caused by the user moving their head the distance threshold 128 and the application of the gain value 126 to the angular distance 120) causes (e.g., always causes) a UI selection change. For example, the distance threshold 128 and the gain value 126 are determined such that when a user moves their head at least the distance threshold 128 (which causes the gain value 126 to be applied to the angular distance 12), the new position is the position 132-3, which is in a different selectable region (e.g., selectable region 144b). In other words, from the position 132-1, a small downward direction (but greater than the distance threshold 128) would not move the position indicator to another position (e.g., position 132-3) in the same region (e.g., selectable region 144a) but rather to a position (e.g., position 132-3) in a new region (e.g., the selectable region 144b).

Figure 1C:
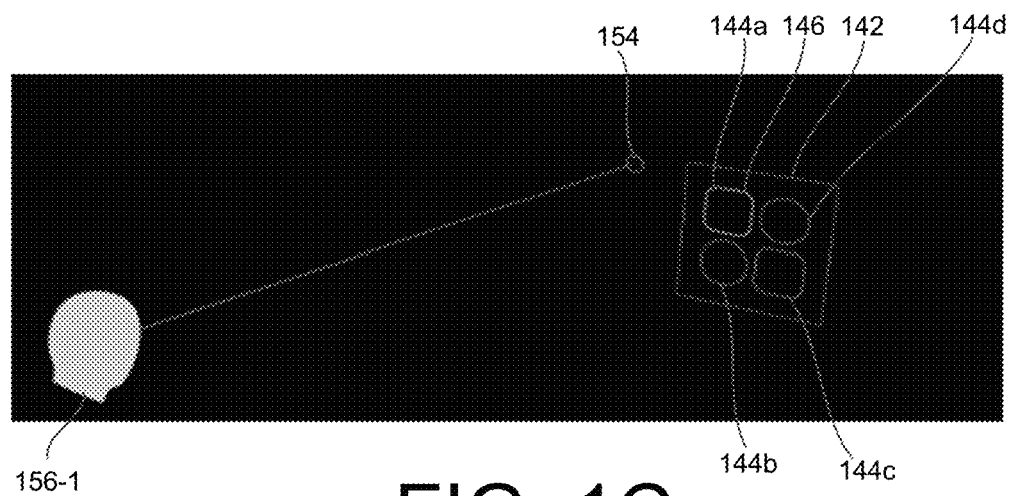
FIG. 1C illustrates a first user interface (UI) selection on the user interface according to an aspect.
Figure 1D:
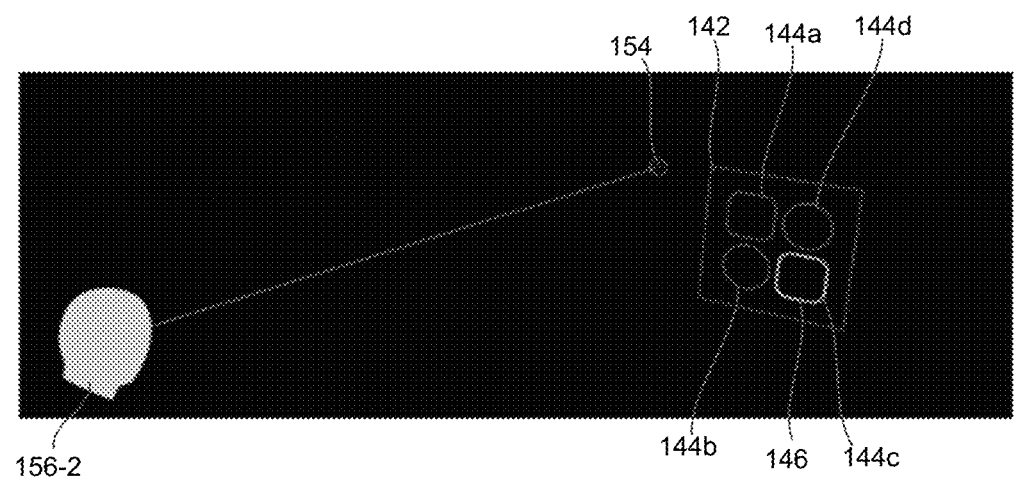
FIG. 1D illustrates a second UI selection on the user interface based on head movement according to an aspect.
Figure 1E:
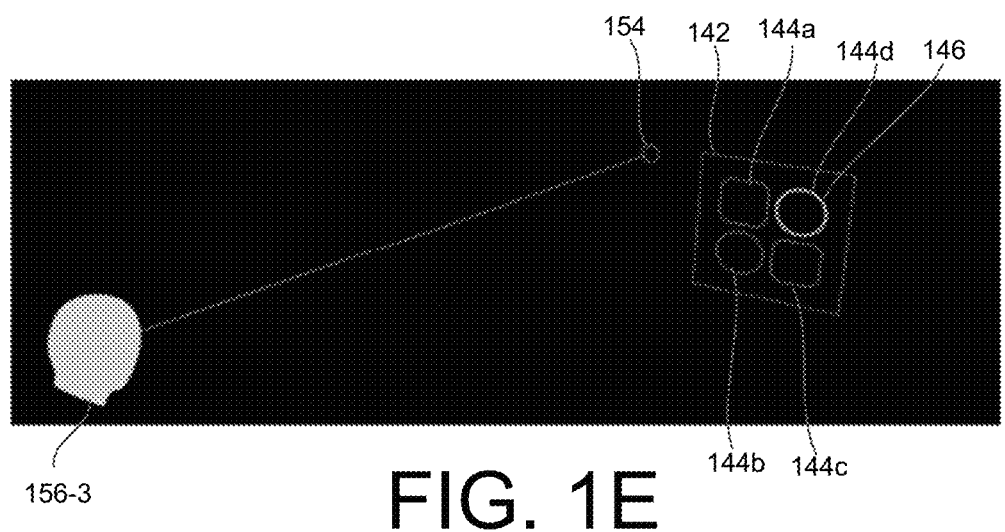
FIG. 1E illustrates a third UI selection on the user interface based on head movement according to an aspect.

FIGS. 1C through 1D illustrate an example of relative head tracking for UI selection on a user interface 142. The user interface 142 of FIGS. 1C through 1D include a selectable region 144a, a selectable region 144b, a selectable region 144c, and a selectable region 144d. The selectable regions 144 are arranged as quadrants. In FIG. 1C, the user interface 142 is initially displayed with a position indicator 150 (e.g., visible cursor) located in a selectable region 144a, which causes a visual indicator 146 to be rendered on the selectable region 144a. In FIG. 1C, the head with the head-mounted display device 100 has a head orientation 156-1. Also, FIG. 1C illustrates a head gaze point 154, which is the location on the display 140 where the user is looking, as determined by their head orientation. In some examples, the user interface 142 is fixed to the display 140 and to the head gaze point 154. Referring to FIG. 1D, the user may move their head in a downward and right direction from the head orientation 156-1 to a head orientation 156-2, which causes the visual indicator 146 to be applied on the selectable region 144c. Although the head orientation has changed, the user interface 142 in FIG. 1D is positioned at the same location with respect to the head gaze point 154 as compared to FIG. 1C. Referring to FIG. 1E, the user may move their head in an upwards direction from the head orientation 156-2 to a head orientation 156-3, which causes the visual indicator 146 to be applied on the selectable region 144d. Although the head orientation has changed again, the user interface 142 in FIG. 1E is positioned at the same location with respect to the head gaze point 154 as compared to FIG. 1D.

Some conventional XR approaches use absolute head-tracking to determine a head gaze point 154 and detect whether the head gaze point 154 falls within a boundary of a region. For absolute head-tracking, a user would have to align the head gaze point 154 within the boundary of a selectable region. For absolute head tracking, the cursor movement directly depends on the head orientation. However, using absolute head tracking with a smaller field of view (e.g., a user interface rendered on augmented reality (AR) glasses), it may be difficult to align the head gaze point 154 within a relatively small region and may require a socially awkward gesture to make a user interface selection. In addition, in some XR environments, applying a gain value to head movement may cause disorientation to the user. However, according to the techniques discussed herein, the position indicator's movement depends on the angular distance 120 (e.g., the delta) between the previous and new head orientation (e.g., head orientation 156-1 and head orientation 156-2 or head orientation 156-2 and head orientation 156-3), as well as the gain value 126 that is applied to the angular distance 120 to either amplify or reduce the motion of the position indicator 150, which can provide subtle and graceful user interactions with the user interface 142. Furthermore, the application of the gain value 126 in conjunction with the head-locked user interface (e.g., user interface 142) may reduce (or eliminate) potential disorientation to the user.

The head-mounted display device 100 may include one or more processors 101, one or more memory devices 103, and an operating system 105 configured to execute one or more applications 107. The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include any type of storage device that stores information in a format that can be read and/or executed by the processor(s) 101. In some examples, the memory device(s) 103 is/are a non-transitory computer-readable medium. The memory device(s) 103 may store executable instructions that when executed by the processor(s) 101 may execute the operations discussed with reference to the head-mounted display device 100, including the UI rendering engine 122, the sensor system 102, the application (s) 107, and the relative HT selection engine 116. The applications 107 may be any type of computer program that can be executed by the head-mounted display device 100, including native applications that are installed on the operating system 105 by the user and/or system applications that are pre-installed on the operating system 105.

The head-mounted display device 100 may include an optical head-mounted display (OHMD) device, a transparent heads-up display (HUD) device, an augmented reality (AR) device, or other devices such as goggles or headsets having sensors, display, and computing capabilities. In some examples, the head-mounted display device 100 includes smart glasses. Smart glasses is an optical head-mounted display device designed in the shape of a pair of eyeglasses. For example, smart glasses are glasses that add information (e.g., project a display) alongside what the wearer views through the glasses. In some examples, the smart glasses include a frame holding a pair of lenses and an arm portion coupled to the frame (e.g., via a hinge).

Figure 2:
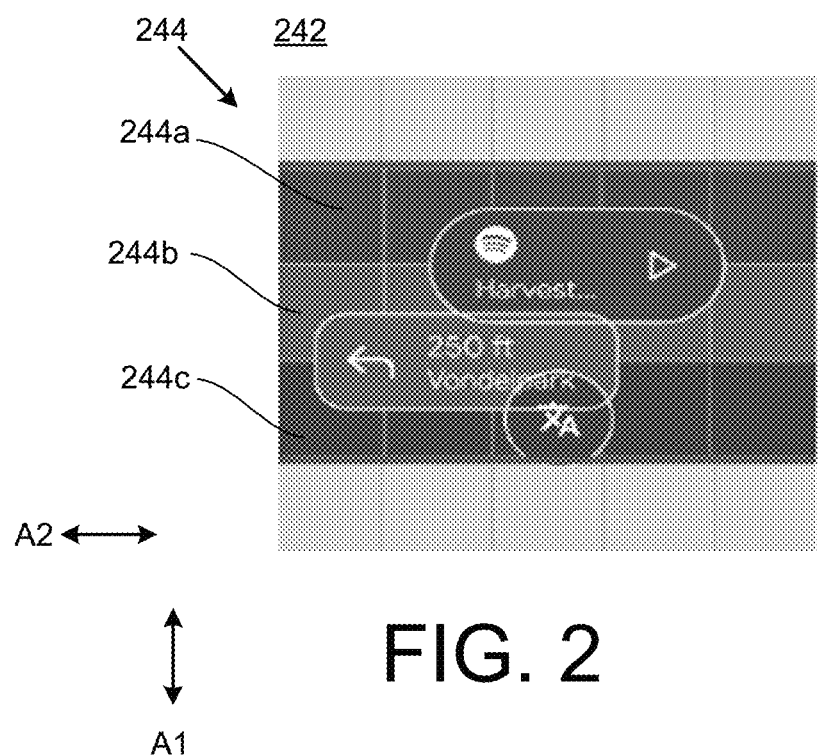
FIG. 2 illustrates an example of a user interface of the head-mounted display device according to another aspect.

FIG. 2 illustrates a user interface 242 according to another aspect. The user interface 242 may be an example of the user interface 142 of FIGS. 1A to 1E and may include any of the details discussed with reference to those figures. The user interface 242 includes a plurality of selectable regions 244. The selectable regions 244 may be vertically arranged on the user interface 242 in a direction A1. The direction A1 may be a vertical direction that extends from the top of the user interface 242 to the bottom of the user interface 242. The selectable regions 244 include a selectable region 244a (e.g., a top region), a selectable region 244b (e.g., a middle region), and a selectable region 244c (e.g., a bottom region). The selectable region 244b is located between the selectable region 244a and the selectable region 244c. In some examples, each selectable region 244 may extend a width (e.g., an entire width) of the user interface 242 in a direction A2. The direction A2 may be perpendicular to the direction A1.

Figure 3:
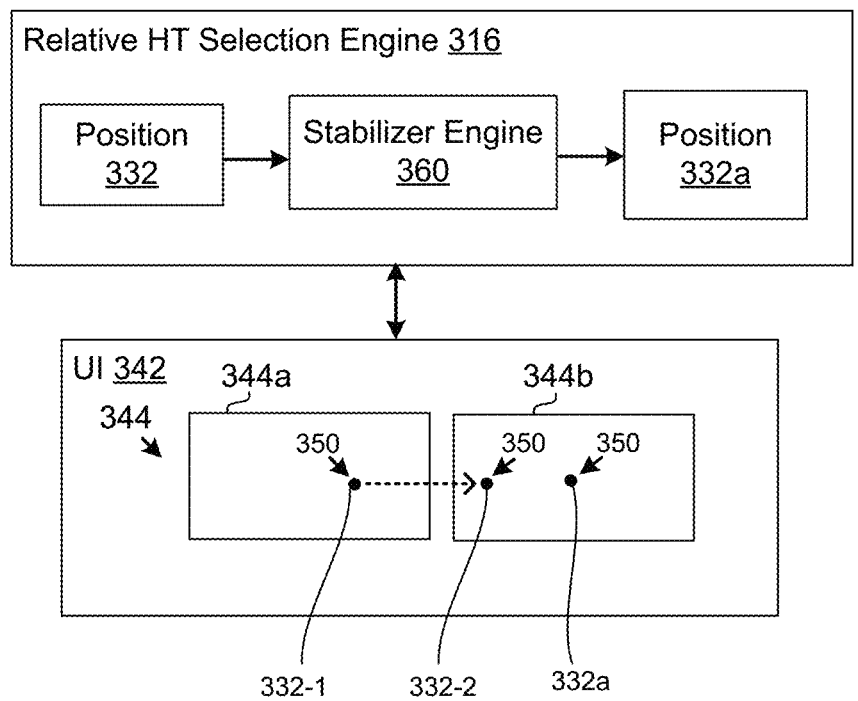
FIG. 3 illustrates a relative HT selection engine with a stabilizer engine according to an aspect.

FIG. 3 illustrates an example of a relative HT selection engine 316 with a stabilizer engine 360 according to an aspect. The relative HT selection engine 316 may be an example of the relative HT selection engine 316 of FIGS. 1A to 1E and may include any of the details with respect to those figures. The stabilizer engine 360 may programmatically update (without user prompting) a position of a position indicator 350 when a new UI selection is detected on a user interface 342. In some examples, re-positioning the position indicator 350 when a new UI selection is detected may minimize jitter (e.g., bouncing between two selectable regions 344). For example, in response to detecting a selection to a selectable region 344 (e.g., selectable region 344b), the stabilizer engine 360 may update a position 332 of the position indicator 350 from a position 332-2 to a new position 332a on the user interface 342.

In further detail, the position indicator 350 may be positioned at a position 332-1 in a selectable region 344a, which causes the selectable region 344a to be visually highlighted. The user may move their head in a direction (e.g., a right direction), which causes the relative HT selection engine 316 to move the position indicator 350 to a position 332-2. Because the position 332-2 is located within a different selectable region (e.g., selectable region 344b), the relative HT selection engine 316 may visually identify the selectable region 344b. In addition, in response to detection of a new UI selection, the stabilizer engine 360 may programmatically move the position indicator 350 to a new position (e.g., position 332a). The new position (e.g., position 332a) may be a predetermined position within the newly selected selectable region (e.g., selectable region 344b). In some examples, the position 332a is within a central region of the selectable region 344b. In some examples, the position 332a is a central point of the selectable region 344b.

Figure 4:
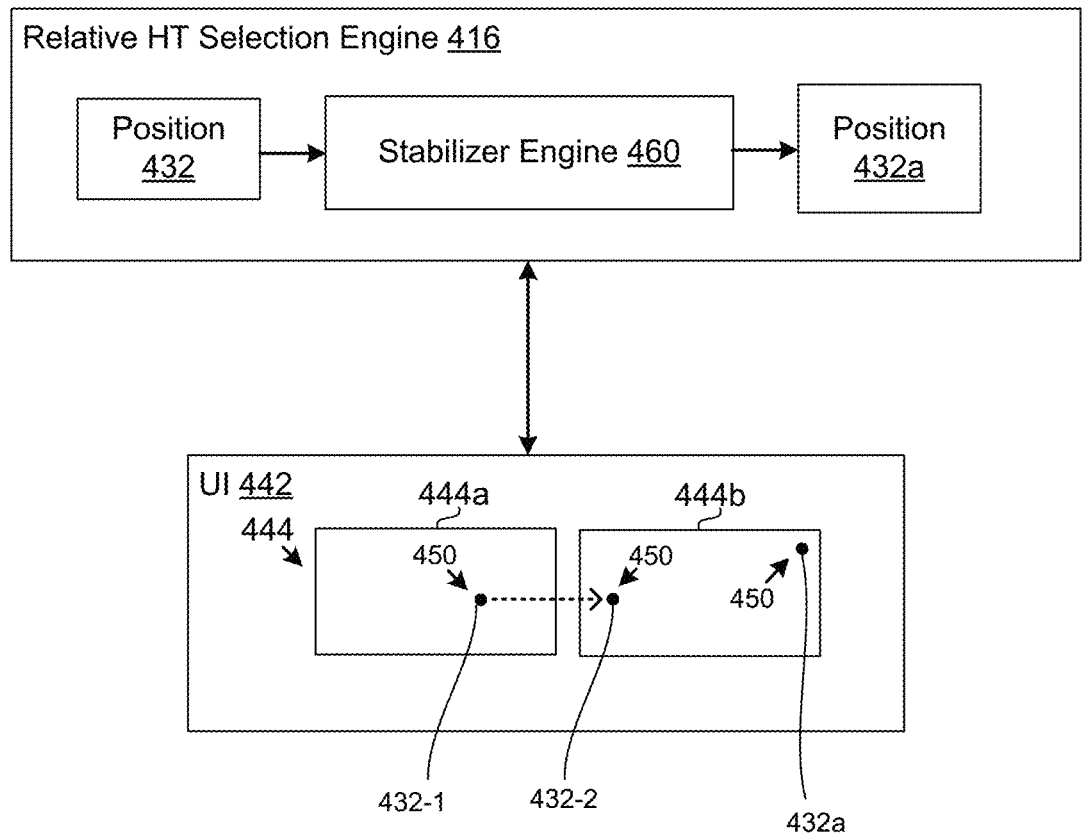
FIG. 4 illustrates a relative HT selection engine with a stabilizer engine according to another aspect.

FIG. 4 illustrates an example of a relative HT selection engine 416 with a stabilizer engine 460 according to an aspect. The relative HT selection engine 416 may be an example of the relative HT selection engine 416 of FIGS. 1A to 1E and may include any of the details with respect to those figures. The stabilizer engine 460 may programmatically update (without user prompting) a position of a position indicator 450 when a new UI selection is detected on a user interface 442. In some examples, re-positioning the position indicator 450 when a new UI selection is detected may minimize jitter (e.g., bouncing between two selectable regions 444). For example, in response to detecting a selection to a selectable region 444 (e.g., selectable region 444b), the stabilizer engine 460 may update a position 432 of the position indicator 450 from a position 432-2 to a new position 432a.

In further detail, the position indicator 450 may be positioned at a position 432-1 in a selectable region 444a, which causes the selectable region 444a to be visually highlighted. The user may move their head in a direction (e.g., a right direction), which causes the relative HT selection engine 416 to move the position indicator 450 to a position 432-2. Because the position 432-2 is located within a different selectable region (e.g., selectable region 444b), the relative HT selection engine 416 may visually identify the selectable region 444b. In addition, in response to detection of a new UI selection, the stabilizer engine 460 may programmatically move the position indicator 450 to a new position (e.g., position 432a). The new position (e.g., position 432a) may be a predetermined position within the newly selected selectable region (e.g., selectable region 444b). In some examples, the position 432a is within a corner portion of the selectable region 444b. In some examples, the position 432a is a corner point of the selectable region 444b. In some examples, the position 432a is an edge of the selectable region 444b. In some examples, the position 432a is a boundary of the selectable region 444b.

Figure 5:
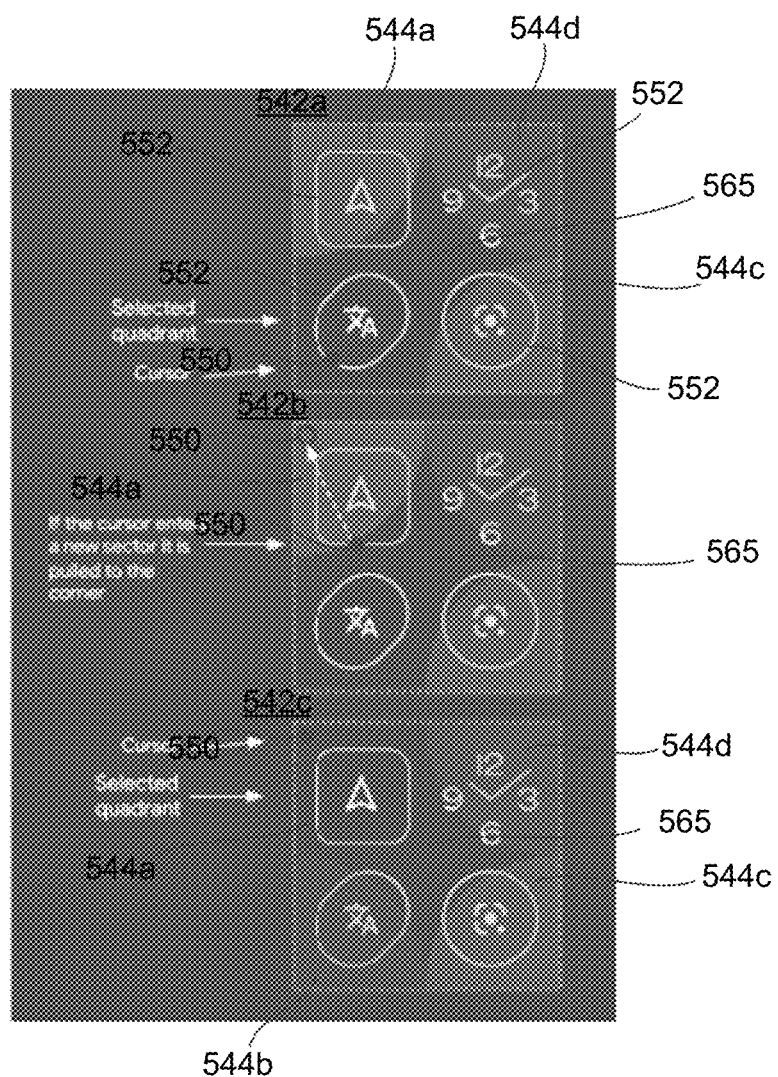
FIG. 5 illustrates example user interfaces for relative head-tracking on a head-mounted display device according to an aspect.

FIG. 5 illustrates example user interfaces using relative head-tracking for UI selections according to an aspect. As shown in FIG. 5, each user interface (e.g., user interface 542a, user interface 542b, user interface 542c) includes selectable regions arranged as quadrant regions. The selectable regions include a selectable region 544a, a selectable region 544b, a selectable region 544c, and a selectable region 544d. Each selectable region includes a UI element 552 that is visibly displayed. Using head movements, the user may move a position indicator 550 to an opposite quadrant (e.g., moving from selectable region 544a to selectable region 544c) without going through other selectable regions. For example, the user interface may define a non-selectable region 565. In some examples, the non-selectable region 565 may be referred to as a dead zone. The non-selectable region 565 is not associated with any UI selection. In some examples, the non-selectable region 565 has one or more curved portions. In some examples, the non-selectable region 565 includes a circular portion. In some examples, the non-selectable region 565 includes a diamond shape.

Referring to the user interface 542a, the position indicator 550 is located in the selectable region 544b. In some examples, when the position indicator 550 is within a currently selected region (e.g., selectable region 544b), the position indicator 550 can move within the currently selected region (e.g., selectable region 544b) and within the non-selectable region 565 without causing a UI selection change (e.g., selectable region 544b continues to be visibly highlighted). Referring to the user interface 542b, when the position indicator 550 enters a new quadrant (e.g., selectable region 544a), the relative HT selection engine (e.g., the relative HT selection engine 116 of FIGS. 1A to 1E) may pull the position indicator 550 to a corner portion of the user interface (e.g., programmatically move the position of the position indicator 550 to the corner portion). As shown in the user interface 542c, the currently selected region is the selectable region 544a. In some examples, when the position indicator 550 is within a currently selected region (e.g., selectable region 544a), the position indicator 550 can move within the currently selected region (e.g., selectable region 544a) and within the non-selectable region 565 without causing a UI selection change (e.g., selectable region 544a continues to be visibly highlighted).

FIG. 6 illustrates a user interface 642 using relative head-tracking for UI selections according to an aspect. The user interface 642 may be an example of the user interface 142 of FIGS. 1A to 1E and may include any of the details discussed with reference to those figures. As shown in FIG. 6, the user interface 642 includes selectable regions 644 arranged as quadrant regions. The selectable regions 644 include a selectable region 644a, a selectable region 644b, a selectable region 644c, and a selectable region 644d. In some examples, each selectable region 644 includes an L-shape (e.g., a corner portion closest to the center of the user interface 642 for each selectable region 644 is defined as a non-selectable region 665). Each selectable region 644 includes a UI element 652 that is visibly displayed. The user may move a position indicator to an opposite quadrant without going through other selectable regions 644. For example, the user interface 642 may define a non-selectable region 665. In some examples, the non-selectable region 665 may be referred to as a dead zone. In some examples, the non-selectable region 665 is defined by a length and a width. In some examples, the non-selectable region 665 is located in the center of the user interface 642. The non-selectable region 665 is not associated with any UI selection. In some examples, the non-selectable region 665 includes a square shape.

FIG. 7 illustrates a user interface 742 using relative head-tracking for UI selections according to an aspect. The user interface 742 may be an example of the user interface 142 of FIGS. 1A to 1E and may include any of the details discussed with reference to those figures. As shown in FIG. 7, the user interface 742 includes selectable regions 744 arranged as quadrant regions. The selectable regions 744 include a selectable region 744a, a selectable region 744b, a selectable region 744c, and a selectable region 744d. Each selectable region 744 may be a circular-based portion at a respective corner of the user interface 742. Each selectable region 744 includes a UI element 752 that is visibly displayed. In some examples, a UI element 752 may partially overlap with the non-selectable region 765. The user may move a position indicator to an opposite quadrant without going through other selectable regions 744. For example, the user interface 742 may define a non-selectable region 765. In some examples, the non-selectable region 765 may be referred to as a dead zone. The non-selectable region 765 is not associated with any UI selection. In some examples, the non-selectable region 765 may be the same as the non-selectable region 565 of FIG. 5. In some examples, the non-selectable region 765 has one or more curved portions. In some examples, the non-selectable region 765 includes a circular portion. In some examples, the non-selectable region 765 includes a diamond shape.

Figure 8:
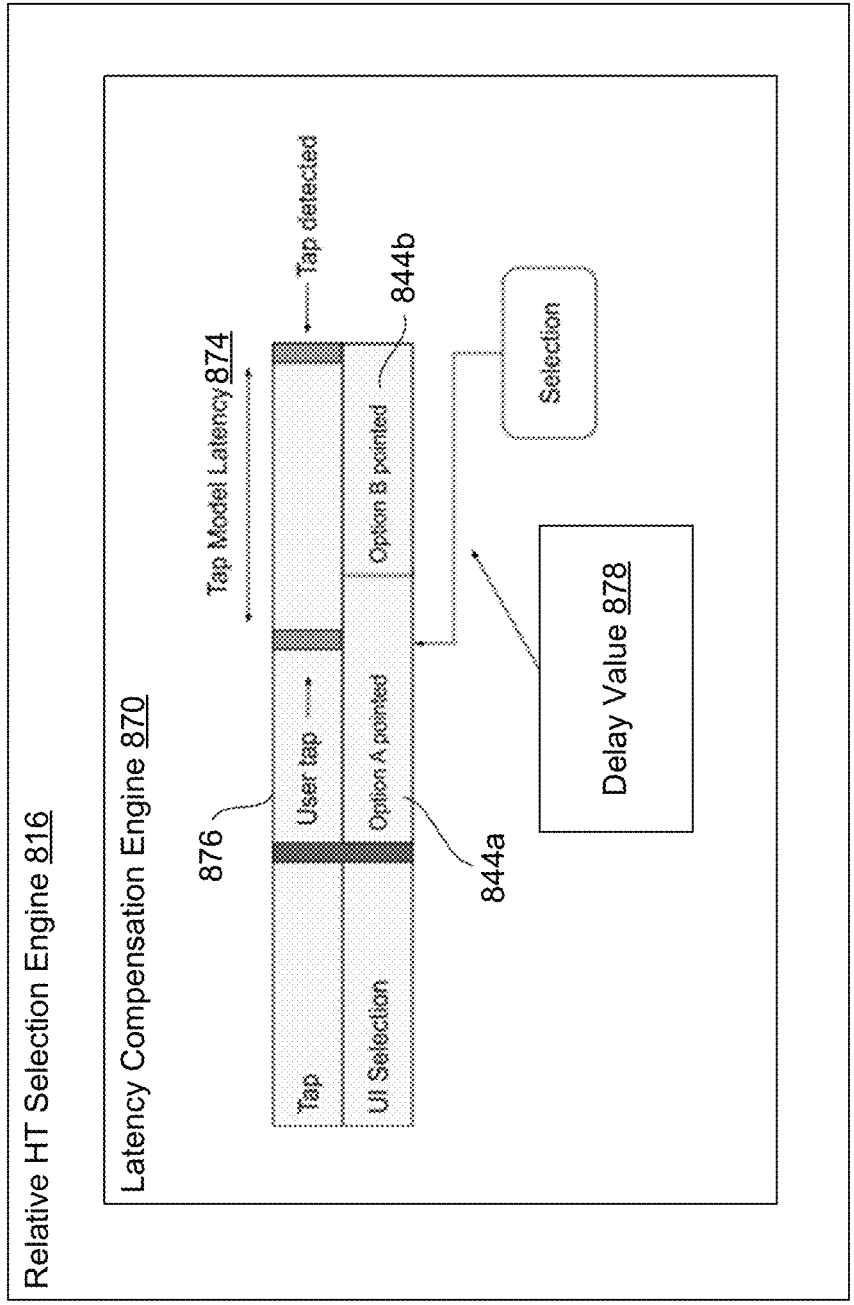
FIG. 8 illustrates a relative HT selection engine with a latency compensation engine according to an aspect.

FIG. 8 illustrates a relative HT selection engine 816 with a latency compensation engine 870 configured to use a delay value 878 to determine which selectable region corresponds to a user tap 876. The relative HT selection engine 816 may be an example of the relative HT selection engine 116 of FIGS. 1A to 1E and may include any of the details discussed with reference to those figures. In some examples, the latency compensation engine 870 may store a history of UI selections, e.g., which selectable regions have been selected over a previous period of time (e.g., the last ten seconds, last 5 seconds, etc.).

A selectable region 844a may be selected, and the user may move their head to select a selectable region 844b. The user may provide a user tap 876 on a UI control on the head-mounted display device, but the head-mounted display device may detect the user tap 876 at a later time. The difference between the time of the user tap 876 and detection of the user tap 876 may be a tap model latency 874. In some examples, the latency compensation engine 870 may set a delay value 878 to correspond to the tap model latency 874. In some examples, in response to detection of the user tap 876, the latency compensation engine 870 may identify which selectable region has been selected at a time that is offset from the delay value 878.

Figure 9A:
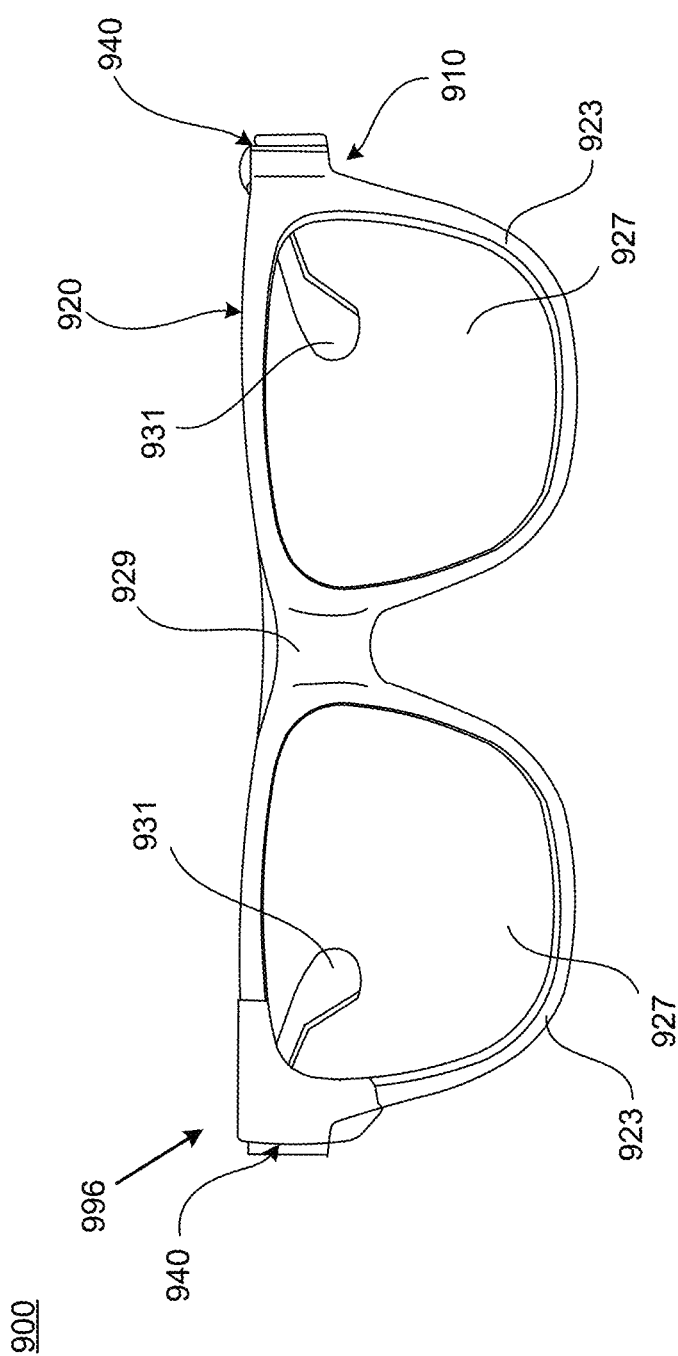
FIG. 9A illustrates a first perspective of smart glasses according to an aspect.
Figure 9B:
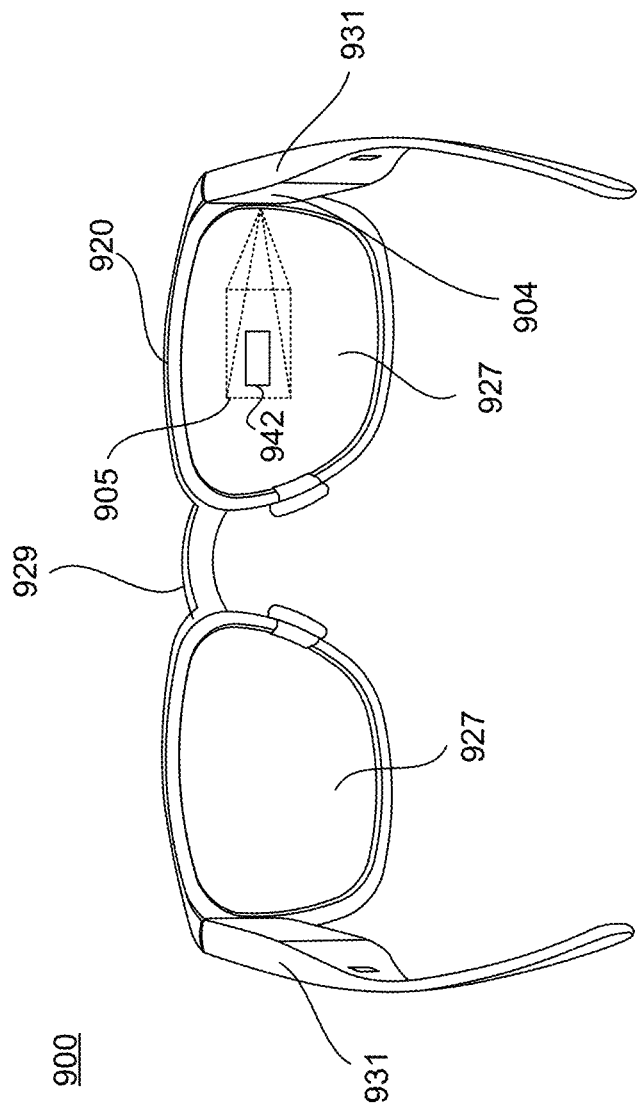
FIG. 9B illustrates a second perspective of smart glasses according to an aspect.

FIGS. 9A and 9B illustrate an example of a head-mounted wearable device 900 according to an aspect. The head-mounted wearable device 900 may be an example of the head-mounted display device 100 of FIGS. 1A to 1E and may include any of the details discussed with reference to those figures. The head-mounted wearable device 900 includes smart glasses 996 or augmented reality glasses, including display capability, computing/processing capability, and object tracking capability. The head-mounted wearable device 900 is configured to render a display 905 with a user interface 942. The user interface 942 may be an example of any of the user interfaces discussed herein with reference to the other figures. FIG. 9A is a front view of the head-mounted wearable device 900, and FIG. 9B is a rear view of the head-mounted wearable device 900.

The head-mounted wearable device 900 includes a frame 910. The frame 910 includes a front frame portion 920, and a pair of arm portions 931 rotatably coupled to the front frame portion 920 by respective hinge portions 940. The front frame portion 920 includes rim portions 923 surrounding respective optical portions in the form of lenses 927, with a bridge portion 929 connecting the rim portions 923. The arm portions 931 are coupled, for example, pivotably or rotatably coupled, to the front frame portion 920 at peripheral portions of the respective rim portions 923. In some examples, the lenses 927 are corrective/prescription lenses. In some examples, the lenses 927 are an optical material including glass and/or plastic portions that do not necessarily incorporate corrective/prescription parameters.

In some examples, the head-mounted wearable device 900 includes a display device 904 configured to output visual content, for example, on a display 905, so that the visual content is visible to the user. The display device 904 may be provided in one of the two arm portions 931. In some examples, a display device 904 may be provided in each of the two arm portions 931 to provide for binocular output of content. In some examples, the display device 904 may be a see through near eye display. In some examples, the display device 904 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 927, next to content (for example, digital images, user interface elements, virtual content, and the like) output by the display device 904. In some implementations, waveguide optics may be used to depict content on the display device 904.

Figure 10:
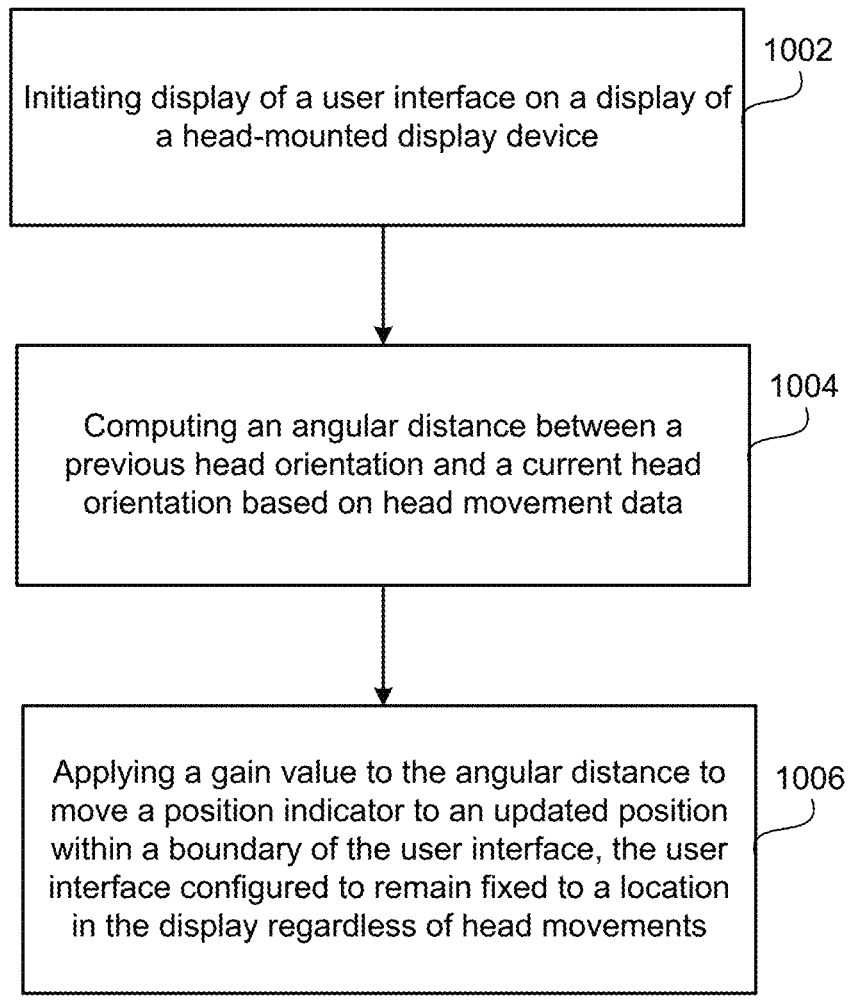
FIG. 10 illustrates a flowchart depicting example operations of relative head-tracking for UI selection on a head-mounted display device according to an aspect.

FIG. 10 illustrates a flowchart 1000 depicting example operations for relative head-tracking to move a position indicator based on head movement data to trigger a change in selection on a user interface with a plurality of selectable regions. The flowchart 1000 may depict operations of a computer-implemented method. The flowchart 1000 is explained with respect to the head-mounted display device 100 of FIGS. 1A to 1E and may include any of the details discussed with reference to those figures. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion.

Operation 1002 includes computing an angular distance 120 between a previous head orientation and a current head orientation based on head movement data 110. Operation 1104 includes updating a position 132 of a position indicator 150 on a user interface 142 displayed on a display 140 of a head-mounted display device 100 based on the angular distance 120 and a gain value 126, the user interface 142 configured to remain fixed to a location in the display 140 regardless of head movements. The updated position 132 may be the previous position 132 plus the product of the gain value 126 and the angular distance 120. When the position 132 of the position indicator 150 is detected within a boundary of a new selectable region 144, the relative HT selection engine 116 detects a selection change and may visually highlight the new selectable region 144. The gain value 126 defines the sensitivity of the head tracking selection. The gain value 126 may be set to require more or less motion from the user to be able to move the position indicator 150 (e.g., the gain value 126 may amplify or reduce the indicator's movement).

Clause 1. A non-transitory computer-readable medium storing executable instructions that when executed by at least one processor cause the at least one processor to execute operations, the operations comprising: computing an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movements.

Clause 2. The non-transitory computer-readable medium of clause 1, wherein the operations further comprise: detecting that the angular distance is equal to or greater than a distance threshold; and in response to the angular distance being equal to or greater than the distance threshold, updating the position of the position indicator.

Clause 3. The non-transitory computer-readable medium of clause 1 or 2, wherein the user interface includes a selectable region, wherein the operations further comprise: detecting a selection to the selectable region based on an updated position of the position indicator.

Clause 4. The non-transitory computer-readable medium of clause 3, wherein the operations further comprise: in response to detecting the selection to the selectable region, providing a visual selection indicator on the selectable region.

Clause 5. The non-transitory computer-readable medium of clause 3, wherein the operations further comprise: in response to detecting the selection to the selectable region, changing the position of the position indicator from the updated position to a new position in the selectable region.

Clause 6. The non-transitory computer-readable medium of clause 5, wherein the new position is located within a central portion of the selectable region.

Clause 7. The non-transitory computer-readable medium of clause 5, wherein the new position is located at an edge of the selectable region.

Clause 8. The non-transitory computer-readable medium of any of clauses 1 to 7, wherein the head movement data includes information from at least one of an accelerometer or a gyroscope.

Clause 9. The non-transitory computer-readable medium of any of clauses 1 to 8, wherein the position indicator is an invisible cursor.

Clause 10. The non-transitory computer-readable medium of any of clauses 1 to 9, wherein the operations further comprise: identifying a newly-selected region on the user interface based on an updated position of the position indicator and a previously-selected region.

Clause 11. A head-mounted display device comprising: at least one processor; and a non-transitory computer readable medium storing executable instructions that when executed by at least one processor cause the at least one processor to: compute an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movements.

Clause 12. The head-mounted display device of clause 11, wherein the executable instructions include instructions that cause the at least one processor to: detect that the angular distance is equal to or greater than a distance threshold; and in response to the angular distance being equal to or greater than the distance threshold, updating the position of the position indicator.

Clause 13. The head-mounted display device of clause 11 or 12, wherein the user interface includes a selectable region, wherein the executable instructions include instructions that cause the at least one processor to: detect a selection to the selectable region based on an updated position of the position indicator.

Clause 14. The head-mounted display device of clause 13, wherein the executable instructions include instructions that cause the at least one processor to: in response to detecting the selection to the selectable region, provide a visual selection indicator on the selectable region.

Clause 15. The head-mounted display device of clause 13, wherein the executable instructions include instructions that cause the at least one processor to: in response to detecting the selection to the selectable region, change the position of the position indicator from the updated position to a new position in the selectable region.

Clause 16. The head-mounted display device of clause 15, wherein the new position is located within a central portion of the selectable region or located at an edge of the selectable region.

Clause 17. A method comprising: computing an angular distance between a previous head orientation and a current head orientation based on head movement data; and updating a position of a position indicator on a user interface displayed on a display of a head-mounted display device based on the angular distance and a gain value, the user interface configured to remain fixed to a location in the display regardless of head movement.

Clause 18. The method of clause 17, further comprising: detecting that the angular distance is equal to or greater than a distance threshold; and in response to the angular distance being equal to or greater than the distance threshold, updating the position of the position indicator.

Clause 19. The method of clause 17 or 18, wherein the user interface includes a selectable region, wherein the method further comprises: detecting a selection to the selectable region based on an updated position of the position indicator.

Clause 20. The method of clause 19, further comprising: in response to detecting the selection to the selectable region, providing a visual selection indicator on the selectable region.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a LED (light emitting diode) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

What is claimed is:

1. A non-transitory computer-readable medium storing executable instructions that when executed by at least one processor cause the at least one processor to execute operations, the operations comprising:
    displaying a user interface, including a plurality of selectable regions, on a display of a wearable display device;
    computing an angular distance between a previous head orientation and a current head orientation based on head movement data; and
    generating an updated position of a position indicator on the user interface based on the angular distance and a gain value, the user interface configured to remain fixed to a location in the display regardless of head movements, the updated position being located within a boundary of one of the plurality of selectable regions.

2. The non-transitory computer-readable medium of claim 1, wherein the operations further comprise:
    detecting that the angular distance is equal to or greater than a distance threshold; and
    in response to the angular distance being equal to or greater than the distance threshold, applying the gain value to the angular distance to generate a modified angular distance, and moving the position indicator by the modified angular distance.

3. The non-transitory computer-readable medium of claim 1, wherein the operations further comprise:
    detecting a selection to a selectable region of the plurality of selectable regions based on the updated position of the position indicator.

4. The non-transitory computer-readable medium of claim 3, wherein the operations further comprise:
    in response to detecting the selection to the selectable region, providing a visual selection indicator on the selectable region.

5. The non-transitory computer-readable medium of claim 3, wherein the operations further comprise:
    in response to detecting the selection to the selectable region, programmatically changing a position of the position indicator from the updated position to a new position in the selectable region.

6. The non-transitory computer-readable medium of claim 5, wherein the new position is located within a central portion of the selectable region.

7. The non-transitory computer-readable medium of claim 5, wherein the new position is located at an edge of the selectable region.

8. The non-transitory computer-readable medium of claim 1, wherein the head movement data includes information from at least one of an accelerometer or a gyroscope.

9. The non-transitory computer-readable medium of claim 1, wherein the position indicator is an invisible cursor.

10. The non-transitory computer-readable medium of claim 1, wherein the operations further comprise:
    identifying a newly-selected region on the user interface based on the updated position of the position indicator and a previously-selected region.

11. The non-transitory computer-readable medium of claim 1, wherein the plurality of selectable regions include quadrant regions.

12. The non-transitory computer-readable medium of claim 1, wherein the head movement data includes information about an amount in degrees in an x-axis and a y-axis from the previous head orientation and the current head orientation.

13. A wearable display device comprising:
    at least one processor; and
    a non-transitory computer readable medium storing executable instructions that cause the at least one processor to:
        displaying a user interface on a display of the wearable display device;
        compute an angular distance between a previous head orientation and a current head orientation based on head movement data;
        in response to the angular distance being equal to or greater than a distance threshold, generating a modified angular distance by applying a gain value to the angular distance; and
        generating an updated position of a position indicator on the user interface based on the modified angular distance and a current position of the position indicator, the user interface configured to remain fixed to a location in the display regardless of head movements.

14. The wearable display device of claim 13, wherein the user interface includes a selectable region, wherein the executable instructions include instructions that cause the at least one processor to:
    detect a selection to the selectable region based on the updated position of the position indicator being located within a boundary of the selectable region.

15. The wearable display device of claim 14, wherein the executable instructions include instructions that cause the at least one processor to:
    in response to detecting the selection to the selectable region, provide a visual selection indicator on the selectable region.

16. The wearable display device of claim 14, wherein the executable instructions include instructions that cause the at least one processor to:
    in response to detecting the selection to the selectable region, programmatically change a position of the position indicator from the updated position to a new position in the selectable region.

17. The wearable display device of claim 16, wherein the new position is located within a central portion of the selectable region or located at an edge of the selectable region.

18. A method comprising:
    displaying a user interface on a display of a wearable display device;

computing an angular distance between a previous head orientation and a current head orientation based on head movement data;

in response to the angular distance being equal to or greater than a distance threshold, generating a modified angular distance by applying a gain value to the angular distance; and moving a position of a position indicator on the user interface to an updated position based on the modified angular distance, the user interface configured to remain fixed to a location in the display regardless of head movement.

19. The method of claim 18, wherein the user interface includes a selectable region, wherein the method further comprises:

detecting a selection to the selectable region based on the updated position of the position indicator.

20. The method of claim 19, further comprising:

in response to detecting the selection to the selectable region, providing a visual selection indicator on the selectable region.

\* \* \* \* \*